United States Patent [19]

Yearout et al.

[11] Patent Number: 4,574,007

[45] Date of Patent: Mar. 4, 1986

[54] FRACTIONATING APPARATUS

[76] Inventors: James D. Yearout, 270 Portofino Way, #303, Redondo Beach, Calif. 90277; Robert R. Provin, 5241 Loyola Ave., Westminster, Calif. 92683; John S. Browne, 15965 Stanmont St., Whittier, Calif. 90603

[21] Appl. No.: 647,901

[22] Filed: Sep. 6, 1984

[51] Int. Cl.[4] .............................................. F25J 3/02
[52] U.S. Cl. ...................................... 62/42; 202/158; 261/114 TC
[58] Field of Search ...................... 62/42, 36; 202/158; 261/114 TC

[56] References Cited

U.S. PATENT DOCUMENTS 3,568,462  3/1971  Hoffman et al. .................... 62/42

Primary Examiner—Frank Sever
Attorney, Agent, or Firm—Max Geldin

[57] ABSTRACT

Fractionating apparatus especially designed for use in non-adiabatic distillation comprising two series of corrugated horizontally spaced sheets, each of the two series of sheets extending vertically, one series of such sheets being offset vertically from the other series, and forming a plurality of vertically disposed side channels on each side of the adjacent corrugated metal sheets. The side channels provide a tortuous vertical path for upward flow of vapor, and liquid descending from above is split at each offset horizontal fin of the corrugated sheets and mixed with the neighboring stream, thereby providing efficient mixing of the liquid phase as well as the gas phase, such horizontal fins also providing additional liquid holdup, as the descending liquid tends to puddle on the topside of the fins.

21 Claims, 10 Drawing Figures

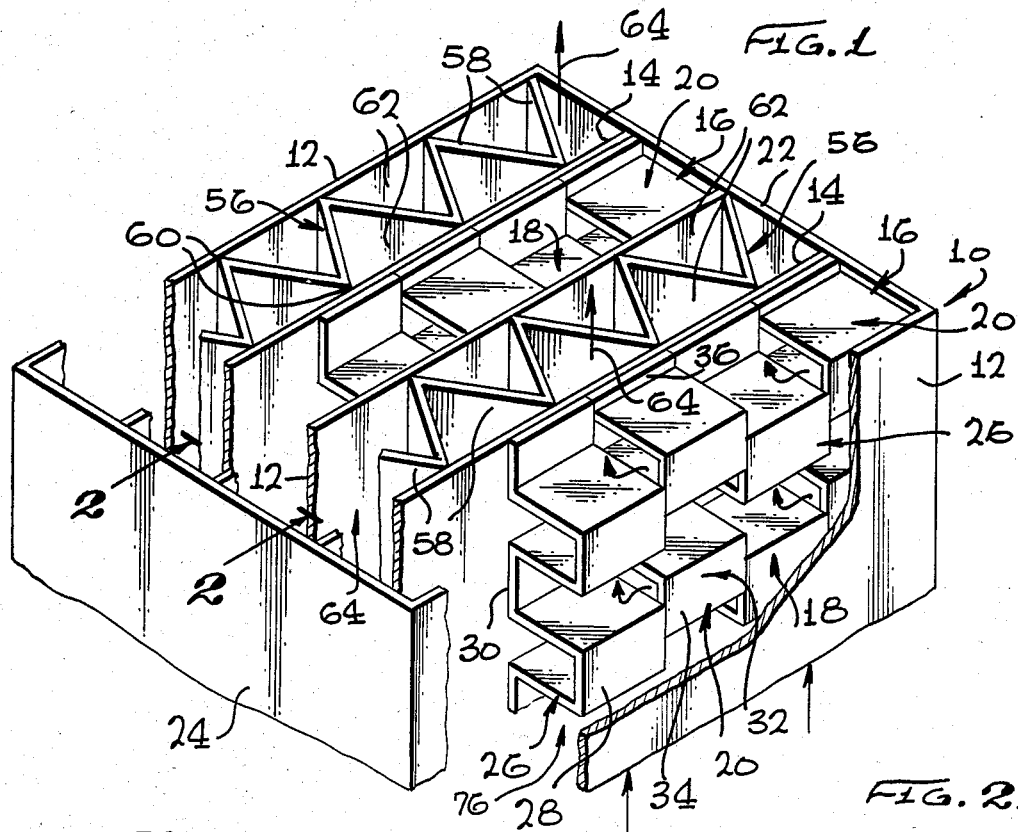
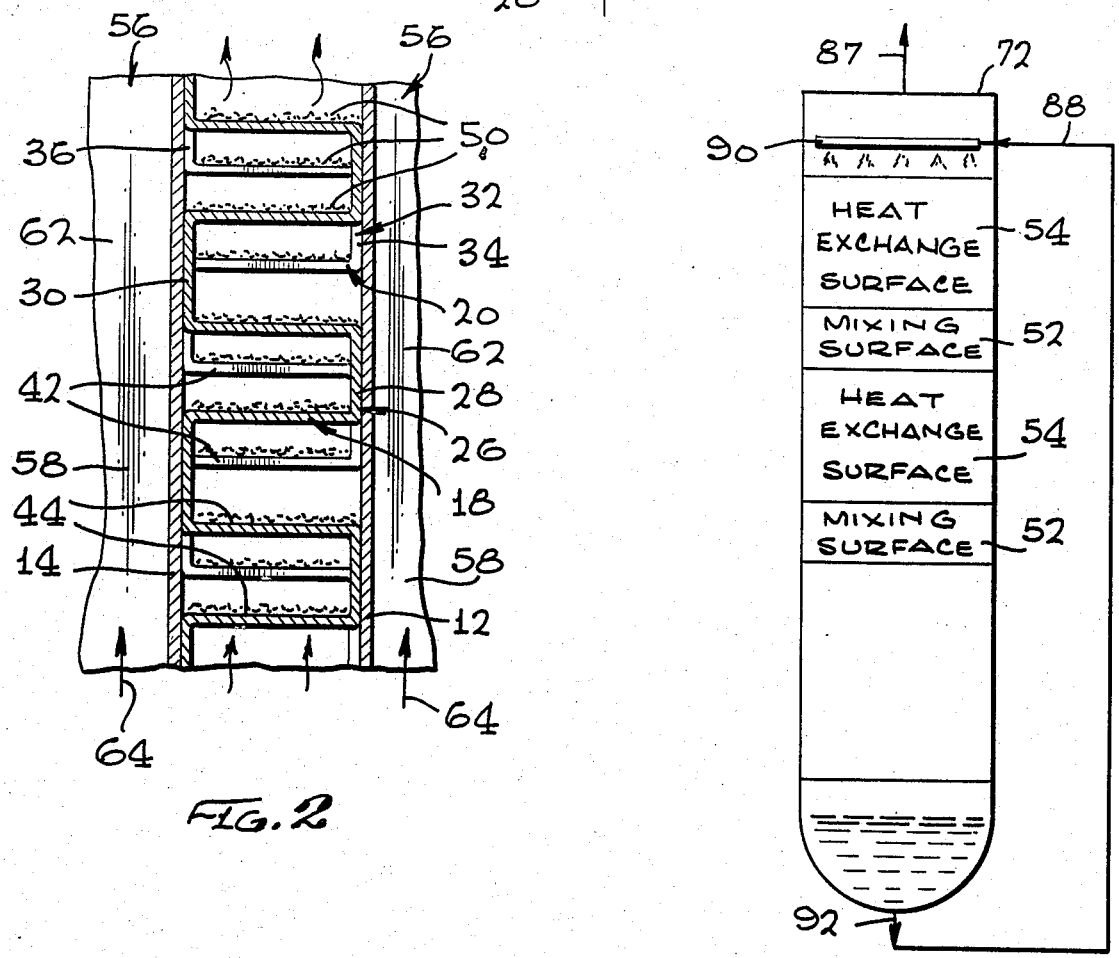

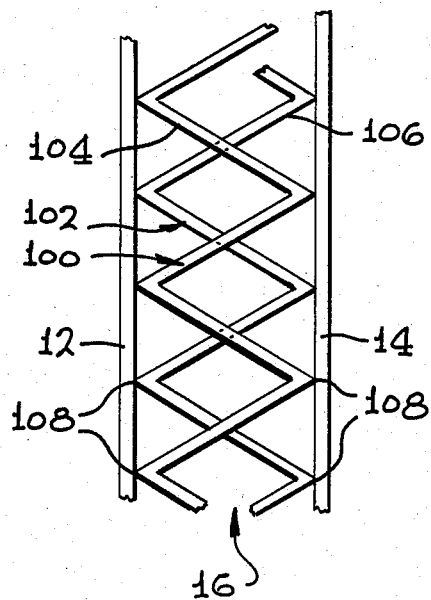
FIG. 6
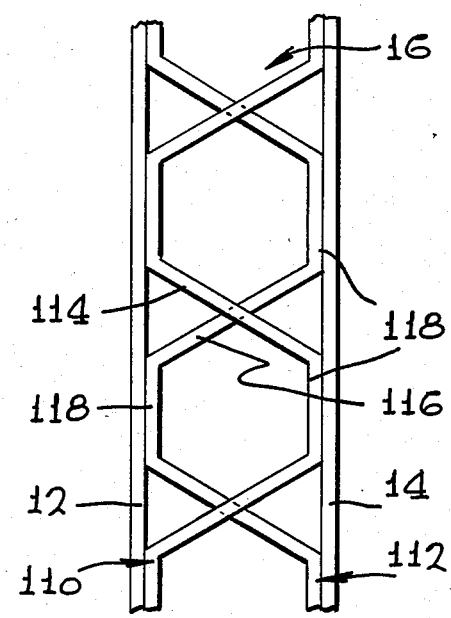
FIG. 7
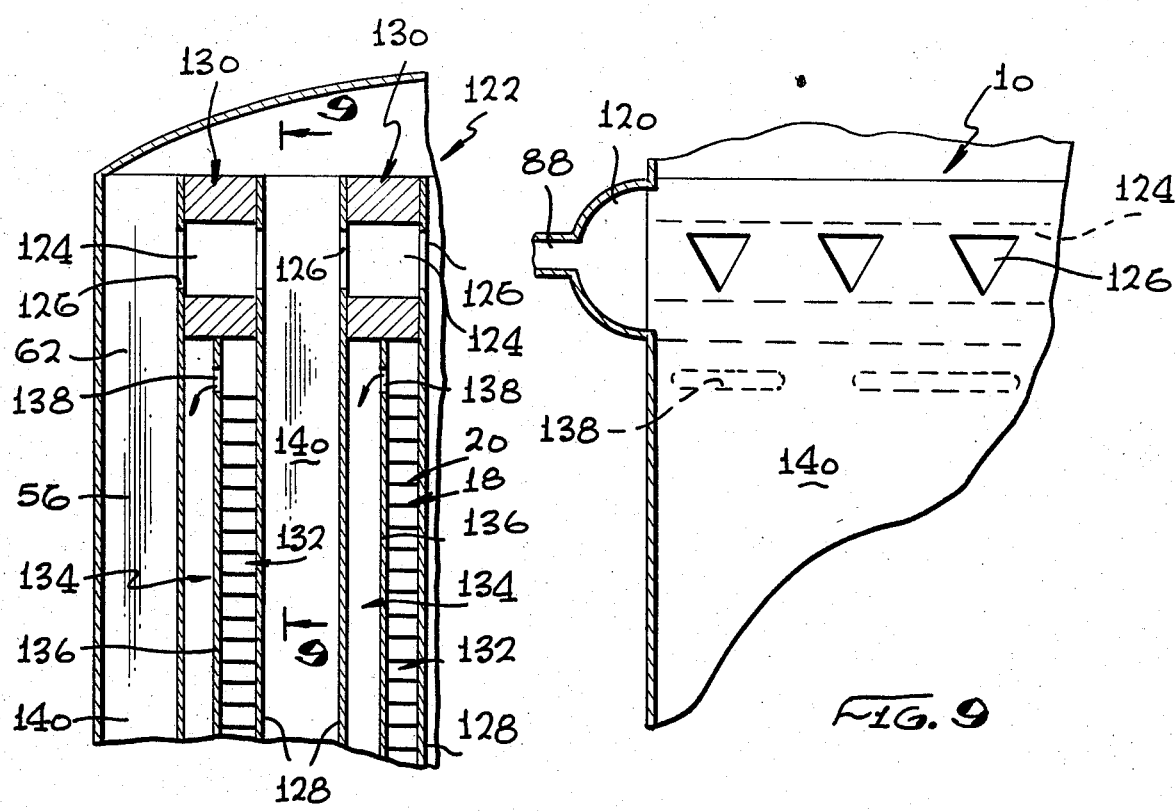
FIG. 8
FIG. 9

FRACTIONATING APPARATUS

BACKGROUND OF THE INVENTION

This invention relates to fractionating apparatus, and is particularly concerned with novel fractionating structures particularly designed for use in non-adiabatic distillation.

One of the primary requirements of apparatus to be employed in non-adiabatic distillation is that both the liquid and gas phases be completely mixed during their travel through the fractionating zone. Another requirement is to provide a means of holding sufficient liquid within the fractionating zone to provide stability.

Various types of internal packing in the form of plate-fin constructions have been designed in the prior art in an effort to obtain greater fractionation efficiency. One such design is that disclosed in U.S. Pat. No. 2,885,195. In such construction, inclined corrugated plates with slots therein are provided for passage of the liquid-vapor mixture being separated, liquid reflux passing downwardly through the channels collecting in the upwardly inclined troughs formed by the corrugations until it overflows through the slots, the vapor passing upwardly through the channels via the slots impinging on the liquid film flowing from the respective slots.

In the "overflow" packing of the above patent, it was attempted to provide liquid holdup using a series of troughs. However, this construction results in a fractionating zone surface which has low surface to volume ratio and little liquid phase mixing. Further, the surface density of the type of material employed in the construction of the above patent is only about one-third that of conventional platefin constructions. Also, of particular significance, the construction of the above patent results in reduced heat transfer and has low structural strength resulting in a low pressure rating, generally only withstanding pressures not in excess of about 50 to 100 psi.

A fractionating zone operating in a true non-adiabatic manner behaves as a wetted wall condenser or evaporator so that if enough surface is provided, enough liquid holdup will be provided by the liquid film on the fractionator surface.

U.S. Pat. No. 3,568,461 to Hoffman discloses a fractionating apparatus or unit comprising two series of corrugated metal sheets disposed in vertical relation, each series of the two series of corrugated sheets or plates extending horizontally across the apparatus, the sheets of each series of corrugated sheets being substantially in vertical alignment, but with the second series of corrugated sheets offset from the first series of corrugated sheets. The result is the formation of a plurality of vertically disposed channels or paths formed by the vertically disposed cells of adjacent offset corrugations, with a portion of the alternate offset corrugations of alternate series of corrugations positioned in such vertical flow channels.

However, in the structural arrangement of the above patent, there is insufficient tortuous flow of vapor upwardly, and insufficient liquid holdup, to effect efficient mixing of liquid and vapor to provide highly efficient mass transfer for non-adiabatic fractionation.

It is accordingly an object of the present invention to provide fractionating apparatus particularly designed for efficient non-adiabatic fractionation, by the provision of means for efficient mixing of vapor and liquid, including continuous separation and intermixing of the adjacent vapor streams, and intermixing thereof with descending liquid, and also means for providing additional liquid holdup for stable operation.

SUMMARY OF THE INVENTION

According to the present invention, there is provided a fractionating apparatus or unit which is specially adapted for non-adiabatic distillation, comprising two spaced series of corrugated sheets, preferably metal sheets, disposed in horizontal relation, each of the two series of corrugated sheets extending vertically of the unit, the sheets of each series of corrugated sheets being substantially in horizontal alignment, with the sheets of the second series of corrugated sheets alternately positioned between the sheets of the first series of corrugated sheets, and offset from the first series of corrugated sheets. This arrangement results in the formation of a plurality of vertically disposed side channels between alternate offset corrugations, each corrugation of the sheets forming a pair of vertically disposed side channels between the upper and lower fins of such corrugation on each side thereof, each of such pair of side channels being separated by a horizontal fin of the adjacent offset corrugation.

Such side channels provide a tortuous vertical path for upward flow of vapor into contact with descending liquid to provide highly efficient mixing for mass transfer.

More specifically, vapor moving upward through such side channels is split at each offset fin and mixed with the vapor in the adjoining passageway. Liquid descending from above is also split at each fin offset, and mixed with the neighboring stream, thereby providing a very efficient mixing of the liquid phase as well as the gas. Each horizontal fin also provides additional liquid holdup, as the descending liquid tends to puddle on the top side of the fin.

According to a preferred embodiment, each of the corrugations of the two offset series of corrugated sheets is substantially rectangularly shaped. However, such corrugations can be triangular or trapezoidal in shape, as described in greater detail below.

The two series of corrugated sheets are disposed between vertical partitions or walls which extend to the opposite side walls of the apparatus, and from the lower to the upper end of the apparatus. Heat can be exchanged with a cooling medium in a conventional heat transfer packing or with another fractionating stream. The fractionating apparatus has an inlet at its lower end for introduction of a gas and an outlet at its upper end for removal of overhead vapor.

A series of the above-noted constructions can be placed in side-by-side relation between a series of parallel vertical walls or partitions. According to a preferred embodiment, a plurality of the above-noted fractionating elements can be disposed in alternate relation with a heat transfer pass or passage provided between adjacent fractionating elements. Thus, for example, there can be arranged alternate fractionating elements of the type noted above, spaced from each other by means of a spacer element, e.g., in the form of a vertically disposed corrugated spacer strip, forming vertical passages between the corrugations thereof, for passage of a heat transfer fluid therethrough in indirect heat exchange contact with adjacent fractionating elements.

If desired, there can be provided a plurality of more than two offset series of corrugated sheets, for example, three or four series of corrugated sheets, each series offset from the adjacent series, in providing the fractionating apparatus of this invention.

The fractionating apparatus of the invention provides a more efficient vapor-liquid contact of the mixture undergoing fractionating, and at the same time, maintains the efficiency of the heat transfer surfaces. The novel fractionating apparatus of the invention permits both heat and mass transfer in an efficient manner.

BRIEF DESCRIPTION OF THE DRAWINGS

The invention will be more readily understood by the detailed description below of a preferred embodiment taken in connection with the accompanying drawings wherein:

FIG. 1 is a perspective view, partly broken away, of a multiple unit fractionating device employing fractionating apparatus according to the invention;

FIG. 2 is an enlarged vertical section taken on line 2—2 of FIG. 1;

FIG. 2a is a schematic illustration indicating the function of the elements of the apparatus of FIG. 1;

FIG. 6 illustrates use of corrugated sheets having triangular corrugations, in the fractionating device of the invention;

FIG. 7 illustrates another modification employing corrugated sheets having corrugations of trapezoidal shape;

FIG. 8 shows an alternate form of liquid distribution header which can be employed in the fractionating device of the invention; and FIG. 9 is a section taken on line 9—9 of FIG. 8.

DETAILED DESCRIPTION OF THE INVENTION AND PREFERRED EMBODIMENTS

Figure 3:
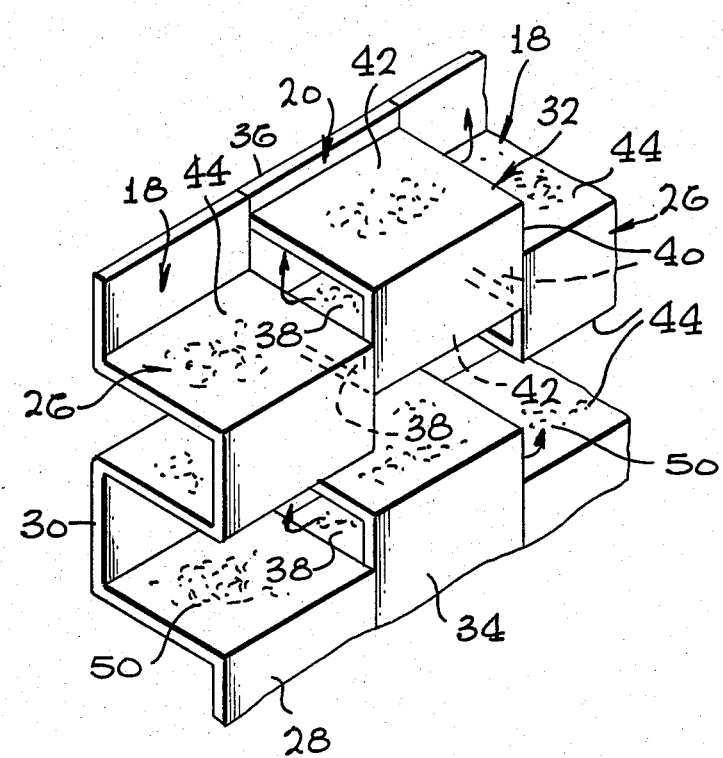
FIG. 3 is an enlarged perspective view of the adjacent corrugated sheets of the apparatus of FIG. 1.

Referring to FIG. 1, there is shown a multiple fractionating device 10 having disposed therein between vertical parallel preferably metal, partitions or parting walls 12 and 14, the fractionating apparatus or unit 16 of the invention, comprising two spaced series of corrugated metal sheets 18 and 20, the respective corrugated sheets 18 being disposed in alternate horizontal alignment, with the other series 20 of corrugated sheets alternately disposed in horizontal alignment between the first series of corrugated sheets 18, with the sheets 20 offset half a corrugation from the corrugated sheets 18, as also seen in FIGS. 2 and 3.

The series of alternate horizontally disposed corrugated sheets 18 are disposed laterally across the unit 16 from one side wall 22 to the opposite side wall 24 thereof, each of the corrugations 26 of the sheet 18 being substantially rectangularly shaped with an angle of 90° between adjacent walls or surfaces of the corrugated sheets, and with the alternate vertical sides 28 and 30 of each corrugation in contact with adjacent parting walls 12 and 14, and connected thereto as by soldering.

The second series of alternate vertically disposed corrugated sheets 20 are of the same shape as the corrugated sheets of the first series 18, except that as noted above, the rectangular corrugations 32 formed by the second series of corrugated sheets 20 are laterally offset about half a corrugation from the horizontally disposed corrugations 26 of the first series of corrugated sheets 18. The adjacent alternate vertical sides 34 and 36 of the corrugated sheets 20 are also connected, as by soldering, to the adjacent parting walls 12 and 14.

It will be understood that the amount of offset of one series of corrugations with respect to the other series can be varied as desired, so that the respective offset corrugations can be offset from each other in an amount less than or greater than half a corrugation.

Hence, as best seen in FIG. 3, it is seen that the two series of alternate offset corrugated sheets 18 and 20 form a plurality of vertically disposed side channels 38 on one side of each of the corrugated sheets 18 or 20, and a plurality of oppositely positioned vertically disposed side channels 40 on the opposite side of each of the corrugated sheets 18 or 20. Accordingly, it will be seen that each corrugation such as 32 of the corrugated sheet 20 forms a pair of the vertically disposed side channels 38 between the upper and lower horizontal fins 42 on one side of the corrugations, and a pair of side channels 40 between such upper and lower fins on the opposite side of the corrugation 32. Each of the pair of side channels 38 on one side of the corrugation 32 is separated by a horizontal fin 44 of the corrugation 26 of the adjacent corrugated sheet 18, and each of the side channels 40 on the opposite side of the corrugation 32 is separated by the horizontal fin 44, on the adjacent corrugation 26 of the adjacent corrugated sheet 18. Similarly, each corrugation 26 of the corrugated sheet 18 forms a pair of vertically disposed channels 38 and 40 on the opposite sides of the corrugation between the upper and lower horizontal fins 44 of such corrugation, such side channels being separated by the horizontal fin 42 of the adjacent corrugation 32.

Thus, a vapor or gas mixture moving upwardly in the fractionating apparatus 16 is split at each pair of opposite offset side channels 38 and 40 and mixed with the vapor in the adjoining passageway of the adjacent corrugation and forming a tortuous path through the side channels 38 and 40 as the vapor moves upwardly in the apparatus.

Liquid descending from above drips from the side channels 38 and 40 downwardly and is split at each offset fin 42 or 44, and mixed with the neighboring liquid stream, thereby providing highly efficient mixing of the liquid phase, and efficient mixing of the gas phase with the liquid phase. The horizontal fin surfaces 42 and 44 also provide additional liquid holdup, as the descending liquid puddles on the top surfaces of such fins as indicated at 50 in FIG. 2. Since there is no bubbling of vapor through liquid, entrainment and foaming problems are absent and the pressure drop in the packing is relatively low.

The corrugated sheets 18 and 20 can have from four to ten fins per inch, and up to eight offsets per inch. This results in a very high surface to volume ratio. Also, since the corrugations 26 and 32 of the corrugated sheets 18 and 20, are of rectangular shape, and the fins 42 and 44 of such corrugations are positioned normal to the parting sheets 12 and 14, as best seen in FIG. 2, and a high number of such fins per inch can be employed, much higher pressures can be tolerated by the fractionating apparatus of the present invention, e.g., from about 300 psi up to about 900 psi, as compared to about 50 to 100 psi for the fractionation device containing the inclined troughs of above U.S. Pat. No. 2,885,195. The utilization of such high pressures is particularly desirable in nitrogen-methane separations.

It should be noted that by positioning each of the series of offset corrugated sheets 18 and 20 so that they extend in a vertical direction in the fractionating apparatus, as contrasted to the positioning of the two series of corrugated sheets horizontally across the fractionating apparatus, as disclosed in the above U.S. Pat. No. 3,568,461, markedly different operating results and efficiencies are obtained, in that in the apparatus of the present invention a more tortuous or winding path of vapor flow through the side channels 38 and 40 between adjacent corrugated sheets occurs as contrasted to essentially straight upward passage of vapor flow through the offset channels or passages in the apparatus of such patent, and greater mixing of liquid and mass transfer are also achieved by the provision of the horizontal fin holdup surfaces 42 and 44, in the fractionating apparatus of the present invention, whereas no such liquid holdup surfaces are provided by the arrangement of the fractionation apparatus of the U.S. Pat. No. 3,568,461.

A plurality of the above described units 16 are disposed in a multiple arrangement in parallel spaced relation to each other, as indicated in FIG. 1, sandwiched between passages 62 formed by providing a vertically disposed corrugated spacer sheet 56 e.g. of metal, between vertical parting sheets 12 and 14 of adjacent fractionating units. The corrugated spacers 56 are each formed of a series of corrugations 58, each disposed at an acute angle to the adjacent corrugation, with apices 60 between adjacent corrugations 58 in contact with the opposite vertical parting walls 12 and 14 and connected thereto as by soldering. Such vertically disposed corrugated spacer sheets 56 thus form a series of vertical passages 62 extending from the lower to the upper end of the unit.

A heat transfer medium or fluid is passed upwardly, as indicated at 64, through the wedge shaped vertical passages 62 between the corrugations of the spacer 56 to either incrementally add heat to or withdraw heat from the fractionation or distillation units 16 to effect a non-adiabatic differential distillation in the fractionating units 16 along the length of such units and achieve a highly efficient fractionation therein.

In addition to the fractionating surface itself, most non-adiabatic systems require evaporation or condensation of a two phase mixture where the gas and liquid are traveling in the same direction. This is usually performed on fin surfaces of high density, with the plane of the fin orientation in the direction of flow. This type of fin utilized is chosen for its high heat transfer co-efficients; however, difficulties are encountered in uniformly distributing a liquid phase into the gas stream and local disturbances, such as localized contamination, can cause the liquid distribution to become uneven.

As noted in FIG. 2a, by utilizing short sections of the fractionating surfaces as mixing surfaces, as indicated at 52, corresponding to the surfaces of the corrugated sheets 18 and 20 and heat exchange sections 54, corresponding to the surfaces of the spacer sheets 56, the above problems can be eliminated. Several inches of mixing surface 52, each 12 to 18 inches apart, with high density heat exchange surfaces 54 between, is adequate for good efficiency in most designs. While it is possible to make the entire channel of the mixing surfaces, the pressure drops which would result at the velocities desired for good heat transfer usually are undesirable.

Figure 4:
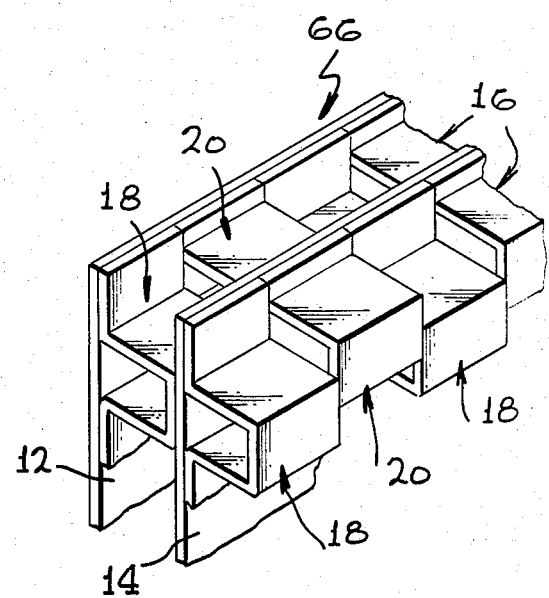
FIG. 4 is a perspective view, partly broken away, of a multiple unit fractionating apparatus according to another embodiment.

Now referring to FIG. 4, there is shown a modification of the multiple fractionating units 16 of FIG. 1 wherein the heat exchange fluid passages 62 and the corrugated sheets 56 therein of FIG. 1 are omitted, and wherein the fractionating units 16 are placed in vertical side-by-side relation with only the vertical parting walls 12 and 14 separating the adjacent units, with no fluid heat exchange passage therebetween. Such a multiple unit fractionating system 66 is employed where it is not desired to utilize an external heat exchange flud to add heat to or to withdraw heat from the respective fractionating units 16, but to effect heat exchange between the adjacent fractionating units.

Figure 5:
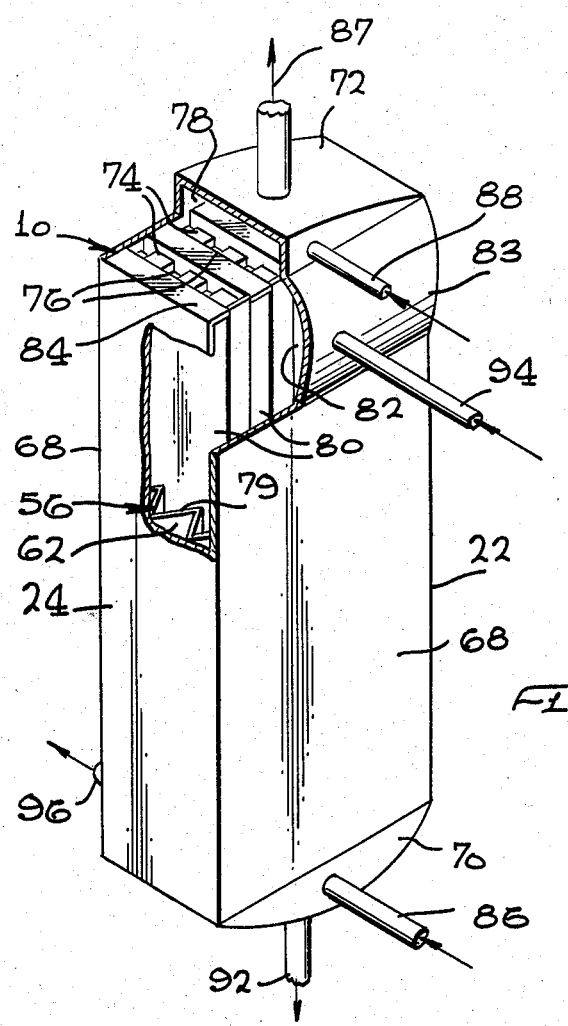
FIG. 5 shows the fractionating apparatus of FIG. 1 assembled to form a fractionating column.

In FIG. 5 there is shown an assembly of the multiple unit fractionating device 10 of FIG. 1 in a fractionating column. The unit 10 is disposed between a pair of end walls 68 and has a lower header 70 and an upper header 72. The upper ends 74 of the fractionating passages 76 of each of the fractionating units 16 are open and communicate with the chamber 78 within the header 72 at the upper end of the column. The upper ends 79 of the heat exchange fluid passages 62 provided by spacers 56 communicate through upper side openings 80 with a plenum or manifold 82 disposed across the column from side wall 22 to side wall 24, and formed by the curved sheet 83 attached to the column adjacent the upper end of one of the end walls 68. It is seen that the upper ends 79 of the heat exchange fluid passages 62 are closed off at 84 from communication with the upper chamber 78.

An inlet 86 is provided in the lower header 70 and is suitably arranged to conduct feed vapor to the lower ends of passages 76 of the fractionating units 16, and an outlet 87 is provided at the top of the upper header 72 to withdraw overhead vapor from the chamber 78 therein. A distillation liquid inlet 88, for example, for applying liquid reflux to the fractionating units 16, as further indicated in FIG. 2a, is also provided in the upper header 72, and which communicates with a plurality of sparge or liquid distribution tubes 90 (see FIG. 2a), each of which is positioned within chamber 78 (not shown in FIG. 5), above the top of a fractionating passage 76 of each of the fractionating units 16. A liquid outlet 92 is provided in the bottom of the lower header 70, and arranged to withdraw fractionated liquid from the bottom of passages 76 of the fractionating units 16, and which as noted in FIG. 2a, can be recycled and employed as reflux at 88. A heat transfer fluid inlet 94 is provided in sheet 83 to introduce such fluid into the manifold 82 and then into the upper ends 79 of the heat transfer fluid passages 62, and an outlet 96 is provided in the lower end of the column and arranged to discharge heat exchange fluid from the lower ends of the heat transfer passages 62. The flow of heat exchange fluid can be in the opposite direction, if desired.

The corrugated sheets employed in the fractionating unit such as 16, can have corrugations of shapes other than the rectangular corrugations 26 and 32 of sheets 18 and 20. Thus, as illustrated in FIG. 6, two series of spaced corrugated sheets 100 and 102 can be disposed in alternate horizontal alignment between parting walls 12 and 14 of the fractionating unit 16, the corrugations 104 and 106 of such sheets having a triangular shape. The triangular corrugations 106 of the second series of corrugated sheets 102 are laterally offset about half a corrugation from the triangular corrugations 104 of the first series of corrugated sheets 100. The apices or corners 108 of the triangular corrugations 104 and 106 are connected as by soldering, to the adjacent parting walls 12 and 14.

In a further modification as illustrated in FIG. 7, two series of corrugated sheets 110 and 112 are disposed in alternate horizontal alignment between parting walls 12 and 14 of fractionating unit 16, the corrugations 114 and 116 of the respective sheets having a trapezoidal or semihexagonal shape, the corrugations 114 and 116 of the two series of corrugations 110 and 112 being laterally offset. The alternate parallel sides 118 of the corrugations 114 and 116 are connected as by soldering to the parting walls 12 and 14.

Corrugated sheets such as 18 and 20 of FIG. 1, having rectangular shaped corrugations, are preferred since they have the strongest construction while providing efficient mixing of vapor and liquid and good liquid holdup. Corrugated sheets such as 100 and 102 of FIG. 6, having triangular corrugations provide the best liquid holdup, but are structurally relatively weak. Corrugated sheets such as 110 and 112 of FIG. 7, having trapezoidal corrugations, provide good liquid holdup and are of intermediate strength between corrugated sheets having the rectangular corrugations of FIG. 1, and those having the rectangular corrugations of FIG. 6.

It will be understood that the shape of the corrugations of one series of corrugated sheets can be different from the corrugations of the second offset series of corrugated sheets. Thus, the corrugations 32 of the series of corrugated sheets 20 can be different from the rectangular corrugations 26 of the corrugated sheets 18, provided that the corrugations of one series of sheets are offset with respect to the corrugations of the other series of sheets, according to the invention.

FIGS. 8 and 9 show an alternate form of liquid distribution header arrangement and fractionating apparatus from that shown in FIGS. 1, 2a and 5, and employing the liquid distribution sparge tubes 90 in header 72. As seen in FIGS. 8 and 9, the liquid inlet 88 is provided in a manifold 120 of a multiple unit fractionating device 122. The manifold 120 communicates with a plurality of parallel spaced pipes 124 each having a plurality of spaced triangular slots 126 on opposite sides of the pipe. The triangular slots 126 act as a weir, giving uniform distribution across pipe or passage 124. As liquid flow rate increases, the height of the liquid in the channel 124 increases, while still leaving space at the top of the channel for the escape of entrained vapor. As the level of liquid in the pipes 124 rises, an increased amount of liquid flows from the triangular slots 126 on each side of the pipes 124, down the opposite sides 128 of each of the fractionating units 130 of the fractionating device 122, in indirect heat exchange relation with such fractionating units.

Each of the fractionating units 130 is comprised of a fractionating portion 132 formed of alternate offset corrugated sheets 18 and 20, similar to the fractionating units 16 of FIG. 1, and an adjacent heat exchange passage 134. An inner parting sheet 136 between the fractionating portion 132 and the heat exchange passage 134 of each unit 130 has a slot 138 adjacent the upper end of the parting sheet, e.g. for passage of nitrogen gas overhead from the fractionating zone 132, into the heat exchange passage 134, when the fractionating apparatus is used for the separation of the components of air by non-adiabatic distillation, as in U.S. Pat. Nos. 4,289,515 and 4,308,043.

Each of the fractionating units 130 of the fractionating device 122 is separated by a passage 140 containing a vertically disposed corrugated spacer sheet 56, similar to the fractionating unit 16 of FIG. 1, for passage of a heat transfer fluid, as in the systems of above U.S. Pat. Nos. 4,289,515 and 4,308,043, through the wedge shaped vertical passages 62 between the corrugations of the spacer sheets 56.

From the foregoing, it is seen that the invention provides a fractionating apparatus of relatively simple and inexpensive construction, and employing a plurality of corrugated metal sheets in a novel arrangement as described herein, which, particularly in its preferred form, will withstand substantial pressures, and which can be formed of any suitable metal such as aluminum, steel, copper, and the like. The construction of the invention device provides highly improved efficient vapor-liquid contact and large heat transfer surfaces to increase the heat transfer efficiency. The present invention and construction thus provides heat and mass transfer in a highly efficient manner superior to the fractionating apparatus of the prior art, including that of above U.S. Pat. No. 3,568,461.

The novel fractionating structures and column containing same according to the invention, are particularly utilized for non-adiabatic distillation employed in the processing of gaseous mixtures for liquefaction or for separation of the components of such mixtures, e.g., for the separation of components of air, or the components of gaseous mixtures of nitrogen and hydrocarbons such as methane, and the like. However, the utility of the invention apparatus is not limited to such applications.

Although certain embodiments of the invention have been described for purposes of illustration, it will be understood that various other modifications of the invention can be made within the spirit of the invention by those skilled in the art, within the scope of the appended claims.

What is claimed is:

1. Fractionating apparatus especially adapted for non-adiabatic distillation comprising means designed for continuous separation and intermixing of the adjacent vapor streams and intermixing thereof with descending liquid and additional liquid holdup, sufficient to provide efficient non-adiabatic fractionation, including a unit having two series of corrugated sheets disposed in horizontal relation across said unit, each of said series of corrugated sheets extending vertically of said unit, the sheets of each said series of sheets being in substantially horizontal alignment, with each of said series of corrugated sheets offset vertically from the adjacent series of corrugated sheets, each corrugated sheet forming a plurality of vertically disposed fins, and forming a plurality of vertically disposed side channels between alternate offset corrugations of alternate corrugated sheets, said side channels providing a tortuous vertical path for upward flow and intimate mixing of vapor, and providing a descending path of flow of liquid from said fins on adjacent corrugations of adjacent corrugated sheets, through said side channels, and intimate mixing of the liquid phase, and intimate mixing of the vapor phase with the liquid phase, the fins on adjacent offset corrugations also providing liquid holdup of the descending liquid.

2. The fractionating apparatus of claim 1, each corrugated sheet forming a plurality of vertically disposed horizontal fins, and each corrugation of said sheets forming a pair of vertically disposed side channels between the adjacent upper and lower horizontal fins of said corrugation on opposite sides thereof, each of said pair of side channels separated by a horizontal fin of the adjacent offset corrugation.

3. The apparatus of claim 1, said unit including a pair of parallel vertically disposed parting walls, said corrugated sheets being metal sheets, each of the corrugations of said two series of corrugated sheets being substantially rectangularly shaped, a pair of opposite parallel sides of said corrugations being connected to said parting walls.

4. The apparatus of claim 1, said unit including a pair of parallel vertically disposed parting walls, said corrugated sheets being metal sheets, each of the corrugations of said two series of corrugated sheets being substantially triangularly shaped, the corners of said corrugations being connected to said parting walls.

5. The apparatus of claim 1, said unit including a pair of parallel vertically disposed parting walls, said corrugated sheets being metal sheets, each of the corrugations of said two series of corrugated sheets being substantially trapezoidal in shape, the opposite parallel sides of said corrugations being connected to said parting walls.

6. The apparatus of claim 1, wherein the corrugations of one series of corrugated sheets are vertically offset about half a corrugation from the corrugations of the adjacent alternate series of corrugated sheets.

7. The apparatus of claim 1, including a sparge tube positioned above said fractionating unit for distributing liquid downwardly across the top of each of said units.

8. The apparatus of claim 1, including a manifold positioned above said fractionating unit for distributing liquid across the top of said unit, and a series of triangular slots in said manifold for distributing liquid downwardly in heat exchange relation with said units.

9. The apparatus of claim 1, including an inlet at the lower end of said unit for introduction of a gas, an outlet at its upper end for removal of overhead vapors, a liquid outlet in the lower end of said unit and a liquid inlet to the upper end of said unit.

10. The apparatus of claim 1, said fractionating apparatus comprising a plurality of said units separated from each other by parting walls.

11. The apparatus of claim 1, said fractionating apparatus comprising a plurality of said units, each having parting walls, said units being disposed in spaced parallel relation, and including spacer means comprising a vertically disposed corrugated spacer sheet positioned in the spaces between parting walls of adjacent fractionating units, said corrugated spacer sheet attached to opposite parting walls of said adjacent spaced fractionating units, said spacer sheets extending across said apparatus between the walls thereof and providing a plurality of vertical fluid passages for a heat transfer fluid between adjacent fractionating units.

12. The apparatus of claim 11, including an inlet in the lower end of said apparatus for introduction of a gas, said gas inlet being connected to the lower end of each of said fractionating units, an outlet at the upper end of said fractionating apparatus for removal of overhead vapors, said outlet being connected to the upper ends of each of said fractionating units, a liquid inlet to the upper ends of each of said fractionating units, a liquid outlet from the lower ends of said fractionating units, a heat exchange fluid inlet to said fluid passages in said spacer sheets between adjacent fractionating units and a heat exchange fluid outlet from said last-mentioned passages.

13. The apparatus of claim 11, including a sparge tube positioned above each of said fractionating units for distributing liquid downwardly across the top of each of said units, said sparge tubes being connected to said liquid inlet.

14. The apparatus of claim 11, including a manifold for receiving liquid, positioned above each of said fractionating units and a series of triangular slots in each of said manifolds for distributing liquid downwardly in heat exchange relation with each of said units.

15. The apparatus of claim 14, each of said fractionating units including a parallel sheet between the parting walls thereof, and forming a heat exchange pass in each fractionating unit, and a slot in the upper end portion of said sheet for passage of overhead gas from said fractionating unit into said heat exchange pass.

16. The apparatus of claim 1, each corrugated sheet forming a plurality of vertically disposed horizontal fins, and each corrugation of said sheets forming a pair of vertically disposed side channels between the adjacent upper and lower horizontal fins of said corrugation on opposite sides thereof, each of said pair of side channels separated by a horizontal fin of the adjacent offset corrugation, each of the corrugations of said two series of corrugated sheets being substantially rectangularly shaped, and wherein the rectangular corrugations of one series of corrugated sheets are vertically offset about half a corrugation from the corrugations of the adjacent alternate series of corrugated sheets.

17. Fractionating apparatus especially adapted for non-adiabatic distillation comprising means designed for continuous separation and intermixing of the adjacent vapor streams and intermixing thereof with descending liquid and additional liquid holdup, sufficient to provide efficient non-adiabatic fractionation, including a plurality of fractionating units each having parting walls, each of said units having two series of corrugated metal sheets disposed in horizontal relation across said unit, each of said series of corrugated sheets extending vertically of said unit, the sheets of each said series of sheets being substantially in horizontal alignment, each of the corrugations of said two series of corrugated sheets being substantially rectangularly shaped with each of said series of corrugated sheets offset vertically about half a corrugation from the corrugations of the other adjacent alternate series of corrugated sheets, each corrugated sheet having a plurality of vertically disposed horizontal fins, and forming a pair of vertically disposed side channels between the upper and lower horizontal fins of said corrugation on opposite sides thereof, between alternate offset corrugations, each of said pair of side channels separated by a horizontal fin of the adjacent offset corrugation, said side channels providing a tortuous vertical path for upward flow and intimate mixing of vapor, and providing a descending path of flow of liquid from the horizontal fins on adjacent corrugations of adjacent corrugated sheets, through said side channels, and intimate mixing of the liquid phase, and intimate mixing of the vapor phase with the liquid phase, the horizontal fins on adjacent offset corrugations also providing liquid holdup of the descending liquid, as the descending liquid tends to puddle on the top side of said fins.

18. The apparatus of claim 17, including an inlet in the lower end of said apparatus for introduction of a gas, an outlet for removal of overhead vapors, said units being disposed in parallel spaced relation, and including spacer means comprising a vertically disposed corrugated metal spacer sheet positioned in the spaces between the side walls of adjacent fractionating units, said corrugated metal spacer sheets attached to opposite side walls of said adjacent spaced fractionating units, said spacer sheet extending across said apparatus between the walls thereof, and providing a plurality of vertical fluid passages for heat transfer fluid between adjacent fractionating units.

19. The apparatus of claim 18, said inlet being connected to the lower ends of each of said fractionating units and said outlet being connected to the upper ends of each of said fractionating units, and including a liquid inlet to the upper ends of each of said fractionating units, a liquid outlet from the lower ends of each of said fractionating units, a heat exchange fluid inlet to said passages between adjacent fractionating units, and a heat exchange fluid outlet from said last mentioned passages.

20. The apparatus of claim 19, including a sparge tube positioned above each of said fractionating units for distributing liquid downwardly across the top of each of said units, said sparge tubes being connected to said liquid inlet.

21. The apparatus of claim 18, each of said fractionating units including a parallel sheet between the parting walls thereof, and forming a heat exchange pass in each fractionating unit, and a slot in the upper end portion of said sheet for passage of overhead gas from said fractionating unit into said heat exchange pass, and including a manifold for receiving liquid, positioned above each of said fractionating units and a series of triangular slots in each of said manifolds for distributing liquid downwardly in heat exchange relation with each of said units.

* * * * *